US006810419B1

(12) United States Patent
Bogler et al.

(10) Patent No.: US 6,810,419 B1
(45) Date of Patent: Oct. 26, 2004

(54) DEVICE FOR OPERATING A NETWORK MANAGEMENT SYSTEM

(75) Inventors: Gerhard Bogler, Penzberg (DE); Maximilian Sevcik, Paris (FR)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,032

(22) PCT Filed: Jul. 30, 1998

(86) PCT No.: PCT/EP98/04777

§ 371 (c)(1),
(2), (4) Date: Feb. 2, 2000

(87) PCT Pub. No.: WO99/08420

PCT Pub. Date: Feb. 18, 1999

(30) Foreign Application Priority Data

May 8, 1997 (EP) ............................................. 97113568

(51) Int. Cl.[7] ............................................. G06F 15/173
(52) U.S. Cl. ....................... 709/224; 709/223; 709/225; 709/206; 714/4; 370/242
(58) Field of Search ................................ 709/203, 206, 709/223, 224, 216, 217, 225; 370/242; 714/4, 47, 48

(56) References Cited

U.S. PATENT DOCUMENTS

| 5,742,762 | A | * | 4/1998 | Scholl et al. | ................ | 709/200 |
| 5,996,010 | A | * | 11/1999 | Leong et al. | ................ | 709/223 |
| 6,008,805 | A | * | 12/1999 | Land et al. | .................. | 345/744 |
| 6,112,235 | A | * | 8/2000 | Spofford | ..................... | 709/223 |

OTHER PUBLICATIONS

Wolfson et al., "Managing Communication Networks by monitoring Databases", 1991, IEEE Transactions on Software Engineering, No. 9.*

Jander, "Welcome to the Revolution", Nov. 1996, Data Communications.*

Ouri Wolfson et al., "Managing Communication Networks by Monitoring Databases", IEEE Transactions on Software Engineering, vol. 17, No. 9, (1991), pp. 944–953.

Mary Jander, "Welcome to the Revolution" Data Communications, vol. 25, No. 16, (1996), pp. 39–42, 44, 46, 48,50, 52–53.

Amy K. Larsen, "Making the WEB Work for Management", Data Communications, vol. 25, No. 17, pp. 33–34.

"CMIP: Common Management Information Protocol Der OSI", Ntz Nachrichtentechnische Zeitschrift, vol. 48, No. 6, (1995), pp. 16–19.

"SNMP: Simple Network Management Protocol Des IAB", Ntz Nachrichtentechnische Zeitschrift, vol. 48, No. 6, (1995), pp. 20–22.

* cited by examiner

Primary Examiner—Glenton B. Burgess
Assistant Examiner—Kevin Parton
(74) Attorney, Agent, or Firm—McCormick, Paulding & Huber LLP

(57) ABSTRACT

An operating device and method handles event messages based on Internet technology for operating a network management system. The operating device receives an event message from a network element of the network management system. Event influences are extracted from the event message and an event profile describing the event influences is generated by the operating device and stored in a database. The operating device further includes a requested operating page, for which an operating page profile is allocated. The operating page profile is compared with event profiles stored in the database, wherein the operating device determines from the comparison event influences and event profiles relevant to the operating page profile, modifies the operating page profile based on the event influences determined, and generates the requested operating page based on the modified operating page profile.

4 Claims, 2 Drawing Sheets

DEVICE FOR OPERATING A NETWORK MANAGEMENT SYSTEM

BACKGROUND OF THE INVENTION RECEIVED

1. Field of the Invention

The present invention is directed to a device and method for handling event messages using Internet technology.

2. Description of the Related Art

Network management systems, particularly telecommunications management networks (TMN), allow operation and maintenance (O&M) of hardware, software and services in the networks for operators of private or public networks.

The problems addressed by the present invention are presented below with respect to a largely standardized TMN system architecture (see, for example, ITU-T, Recommendation M.3010), generally designated as reference numeral 10.

FIG. 1 shows the TMN system architecture 10 in an overview. A fundamental operating sequence can be described as follows:

1. An operator at an operating station or work station 12 ("WS"), e.g., a PC, of the TMN system 10 starts an operating task.
2. The operator authorizes himself relative to an operations system 14 ("OS") of the TMN system 10 and inputs one or more operation and maintenance ("O&M") commands in the framework of an O&M task.
3. These O&M commands are interpreted by the OS 14 and are forwarded to the appertaining devices in the network, such as network element 16 ("NE"), following a potentially required format conversion, for example, through a Data Communications Network 18 ("DCN").
4. At least one NE 16 implements the O&M commands, i.e., undertake corresponding changes in their configuration or make requested data available. The at least one NE 16 communicates the results to the OS 14 which in turn informs the operator.

The explained, basic executive sequence is well documented in standards and numerous publications. The interaction between components in the TMN system 10 may involve standard TMN interfaces 20.

In addition to this control sequence, a number of specific events can occur in a TMN system that affect operation and maintenance in the network:

An outage of telecommunications devices, such as exchanges or individual components, lines, signaling equipment, etc. These outages have different effects: from the outage of vital network functions which must be immediately corrected, to slight deteriorations in network functions whose elimination is not time-critical.

Interventions of operating personnel on site, such as the deactivation of equipment in the network for maintenance purposes.

Automatic blocking/disconnecting of individual equipment in the network, for example due to overload conditions that might require a blocking of individual traffic relationships.

Devices equipped for handling such events in the network, for example exchanges, report these events in the form of what are referred to as event messages to the appertaining OS 14, which in turn informs the operating personnel. The fundamental executive sequence is defined by the standardization bodies for TMN-conforming systems.

The TMN concept of the standardization bodies has the following disadvantages in practice:

TMN system 10 is decoupled from the technical main stream (open, distributed systems).

TMN system 10 is only theoretically capable of supporting multi-vendor equipment, since the complete standardization of the TMN interfaces is not possible in practice.

TMN system 10 is difficult to integrate into an existing network infrastructure.

TMN system 10 is inflexible and difficult to customize to individual operator requirements and O&M sequences.

Internet technology, particularly worldwide web technology (WWW browsers and servers, WWW standards, particularly HTML and HTTP), is viewed as means for overcoming these disadvantages. The application of Internet technology to the TMN concept is still in its infancy but is encountering increasing attention. The reasons for this are:

Internet technology is adaptable to future developments. It represents the outright innovation field in telecommunication. All critical organizations and companies are engaged in this arena. Numerous products either exist or will soon be available.

Internet technology is successful in the marketplace. It is available on different hardware and software platforms. Accessing Internet technology is easy to learn and widely available. Internet technology is thus generally accepted on the basis of ease of entry.

Internet technology facilitates inter-operability between networks of different technologies and organizations. It is based on pragmatic, practice-proven, and generally available standards.

The employment of Internet technology for the control operation sequence in TMN system 10, for example, for the input of operation commands from WS 12 via OS 14 into NE 16 (see FIG. 1), has been investigated by a number of organizations (e.g., Microsoft/Vertel and IBM) and can be considered as having been fundamentally clarified.

The use of Internet technology for handling event messages, by contrast, is largely open.

SUMMARY OF THE INVENTION

The present invention is based on the object of specifying an apparatus and a method for handling event messages in a network management system.

BRIEF DESCRIPTION OF THE DRAWINGS

An exemplary embodiment of the invention (a TMN system 110) is explained in greater detail below with reference to FIG. 2.

DESCRIPTION OF THE PREFERRED EMBODIMENTS

Figure 2:
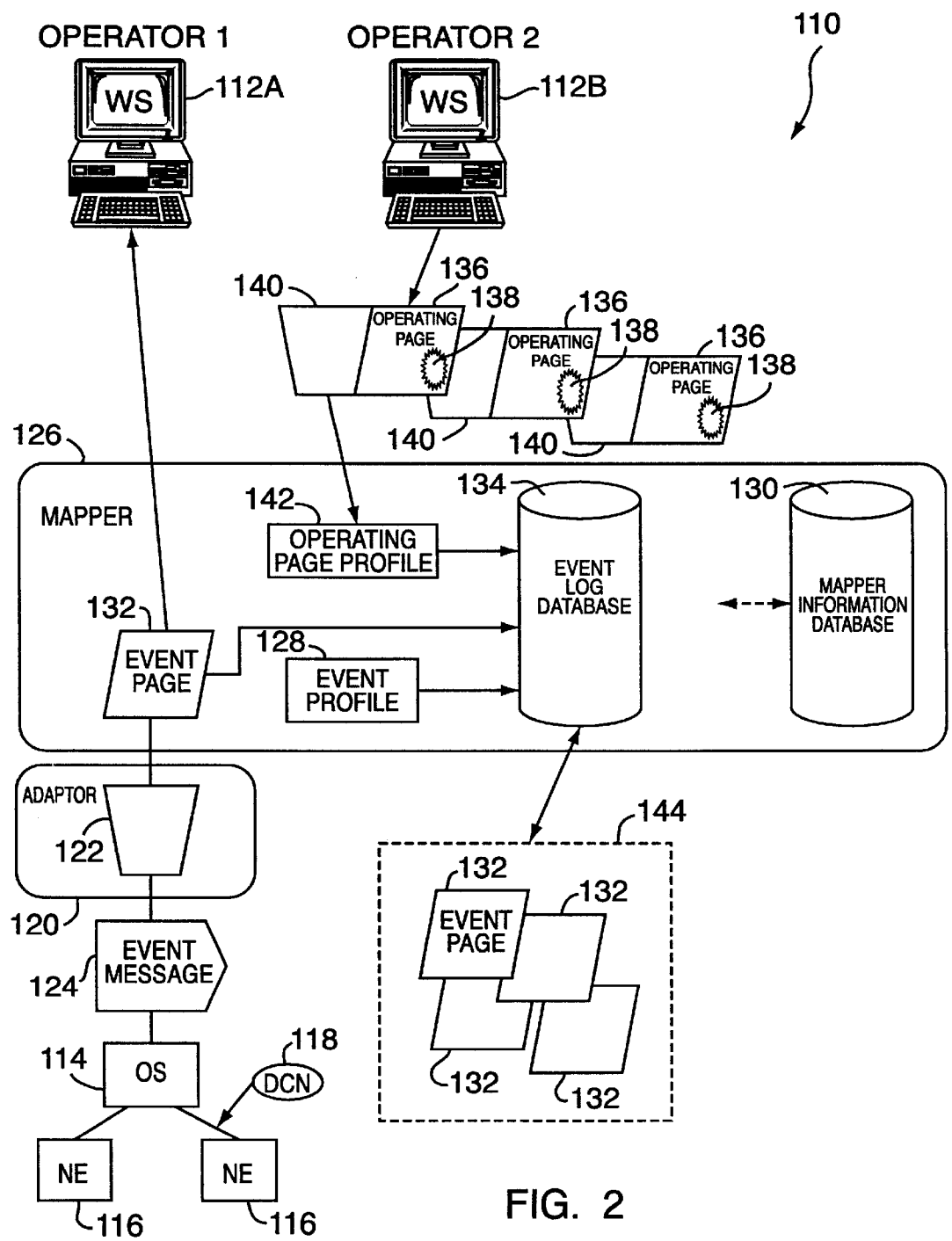
FIG. 2 is a schematic diagram showing the main components of the present invention.

FIG. 2 shows the main components of the inventive operating system (mapper, adaptor) as well as their embedding within TMN system 110. A first work station 112A, operable by an Operator 1, permits, for example, implementing event/alarm processing. A second work station 112B, operable by an Operator 2, permits, for example, implementing of O&M tasks for the administration of lines in the network. Though first and second work stations are shown in FIG. 2, the present invention is not limited to the specific set-up shown and may be used with known set-ups for the TMN concept.

Figure 1:
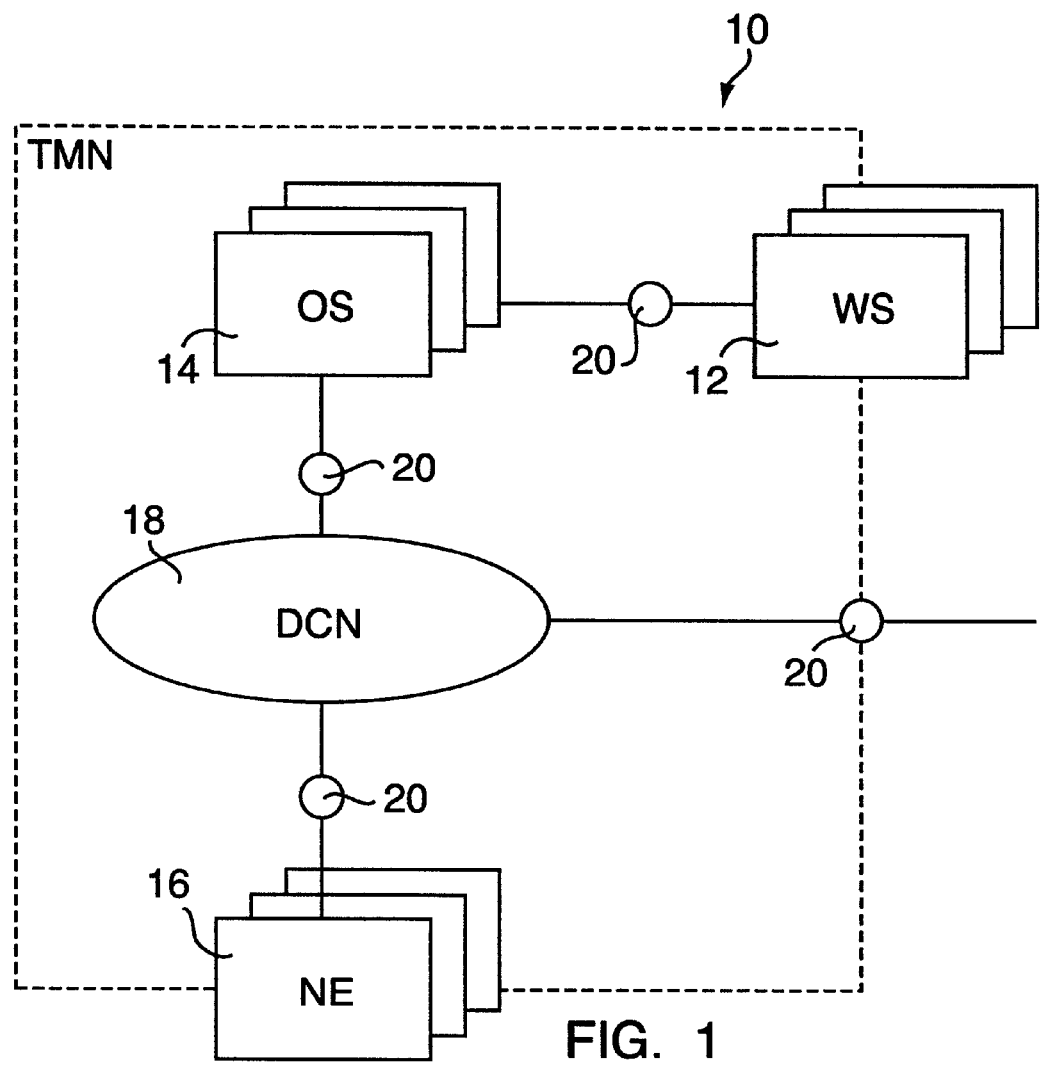
FIG. 1 is a block diagram showing the major components of a telecommunications management network.

O&M commands are interpreted by an operating system 114 and are forwarded to network elements 116. The O&M commands may be forwarded to a network element 116 following a format conversion, such as through a data communication network 118. The inventive executive sequence for the present invention can be described as follows:

1. An adapt or 120 includes adaptor applets 122 that receive event messages 124 from the network or from existing O&M systems, such as the operating system 114 communicating with network elements 116. An applet (a known technology from Java, e.g.) is a software component that is runnable in an arbitrary environment.
2. Each applet 122 extracts the information (e.g., event influences) contained in the event message 124.
3. The tradition al TMN architecture (see, e.g., FIG. 1) is expanded by a mapper 126. The mapper 126 produces an event profile 128 from the event information extracted by the adaptor applet 122 for describing the influences of the event. The event profile 128 can have the following content:

The type of network resources that are affected by the event (for example, lines, switching equipment, signaling points).

Individual network resources that are affected by the event, for example a specific line number.

Registered network users that must be immediately informed of the event (for example, debugging personnel of the operator, such as Operator 1 in FIG. 2).

O&M tasks that are affected by the event which include: tasks that can no longer be implemented or can only be implemented in a limited fashion due to the event; tasks that are possible as a result of the event (following a longer outage); and tasks that become relevant precisely because of the event (for example, maintenance); etc.

Other events on which the newly existing event is dependent or to which there is a relationship. Note: The determination of the affected events ensues with the assistance of a correlation function, numerous such functions being known from the literature.
4. For determining the event profile 128, the mapper 126 maintains a mapper information database 130 that contains the network resources to be managed and the relationships between such resources.
5. The mapper 126, on the basis of the event information or of the event profile 128, generates one or more event pages 132 according to the known Internet HTML principles and stores them chronologically in an event-log database 134. Event profiles 128 may also be stored in the event-log database 134.
6. The operating tasks (O&M tasks) for the TMN system 110 are presented as operating pages 136 formulated in HTML and connected by hyperlinks 138, preferably activatable by the mapper 126. Each operating page 136 corresponds to a selection step and/or to at least one operating step, for example, establishing a line in the network. The application of this Internet technology to individual O&M tasks is known. When the operator (for example, Operator 2 in FIG. 2) calls an HTML operating page 136 within the scope of an operating task, the following activities are initiated:

An operating applet 140 runs within each operating page 136, which determines an operating page profile 142 belonging to the operating page 136. The operating page profile 142 (similar to the event profile 128) contains information allocated to the operating page 136. Among other things, the operating options established by the operating page 136 are described by this information contained in the operating page profile 142 (such as the operable network resources and O&M tasks).

The mapper 126 compares the identified operating page profile 142 to all existing event profiles 128, such as those stored in the event log database 134.

As a result of this comparison, the mapper 126 determines whether event information contained in an event profile 128 describes an event influence that affects the implementability of the operating options (network resources, O&M tasks) described in the operating page profile 142. When this is the case, the mapper 124 brings this situation to the attention of the operator. The following method is utilized for this purpose.

An "event is present" hyperlink, existing in standard form in all HTML operating pages 136, is activated. This can be illustrated by further methods optionally selectable by the operator (such as by flashing or by a running script).

The hyperlink, after clicking, leads the operator directly to the stored event page 132 in the event log database 134.

A plurality of relevant event pages, generally designated by reference numeral 144, can be linked in this way with an HTML operating page 136. This is either displayed for the user or a "next event" hyperlink is activated.

The operator is warned when he attempts to implement an O&M task that is no longer possible or only possible to a limited extent due to an event. Hyperlinks 138 to operating pages 136 of these O&M tasks are deactivated.

7. When an event has been handled (for example, an outage has been eliminated, or a resource is again functional), the network element 116 automatically reports this (or the maintenance crew reports it manually) on the basis of a "state change" event message. The following executive sequence is thereby initiated:

The mapper 126 processes this event message 124, generates an event profile 128 in turn, and removes the original event profile 128 relating to the same network resource which has now become irrelevant, e.g., by removing it from the event log database 134.

For ordinary operating pages 136, the deletion of the original event profile 128 from the event log database 134 causes the "event is present" hyperlinks to be deactivated, and causes O&M tasks that were blocked on the basis of the event (i.e., hyperlinks 138 to operating pages 136 of these O&M tasks were deactivated) to be enabled (i.e., hyperlinks 138 to operating pages 136 of these O&M tasks are once again activated).

For registered users (for example, Operator 1 in FIG. 2), an "event handled" event is generated instead of the original event. The mapper 126 sends a message to the user that the original event has now become meaningless.

The following advantages are achieved by the method of the present invention:

An enhanced efficiency of network operation is possible. Only the events/alarms that are relevant for a current operating execution are displayed. The handling of other events/alarms can be postponed. Operating executions that are not affected by a specific event/alarm can be handled later. This saves operating costs for the network operator.

A generic solution is provided for all TMN event messages and alarms that enables a coordination of the processing of event messages with the O&M tasks.

Adaptable mainstream technology is used for management in public networks.

Independence of the network technology (telephone/ISDN, broadband, data, etc.) is created. This method can be subsequently added to existing O&M systems and organization and maintenance tasks.

A configurable solution is adaptable to individual customers (based on applets, event and operating profiles that can be added and removed with known Internet techniques/tools).

The above-described method is illustrative of the principles of the present invention. Numerous modifications and adaptations thereof will be readily apparent to those skilled in this art without departing from the spirit and scope of the present invention.

We claim:

1. An operating device for operating a network management system comprising:

a network element of said network management system from which said operating device receives an event message;

an adapter for extracting event influences from said received event messages;

an event profile for describing event influences;

a database in which said operating device stores said event profile;

an operating page having an operating page profile allocated thereto, wherein said operating page requests said operating device to compare the operating page profile to event profiles stored in said database, and said operating device determines from said comparison event influences and event profiles relevant to said operating page profile, modifies said operating page profile based on said event influences, and generates said operating page based on said modified operating page profile.

2. An operating device according to claim 1, further comprising at least one event page corresponding to the event profile generated by said operating device, wherein said generated operating page is connected to the at least one event page corresponding to the relevant event profiles determined by said comparison, and said at least one event page is invokable in the operating page by activation of a hyperlink representing "an event is present".

3. An operating device according to claim 1, wherein said operating device is based on Internet technology.

4. A method for handling event messages in a network management system, comprising the steps of:

receiving an event message from a network element by an operating device of said network management system;

extracting event influences from said event message, including those said influences pertaining to the operability of the network element;

generating an event profile by said operating device for said received event message, wherein said event profile describes said event influences extracted from the event message;

storing said event profile in a database by said operating device;

requesting an operating page;

allocating an operating page profile to the requested operating page, said operating page profile describing said event influences of the operating page;

comparing, by said operating device, upon request of said operating page, said operating page profile to said event profiles stored in said database;

determining from said comparison, by said operating device, said event profiles describing said event influences relevant to said operating page profile;

modifying, by said operating device, said operating page profile dependent on relevant said event influences determined by said comparison; and generating said operating page on the basis of said modified operating page profile.

* * * * *